(12) United States Patent
Nakamura et al.

(10) Patent No.: US 6,357,811 B1
(45) Date of Patent: Mar. 19, 2002

(54) COUPLING STRUCTURE OF THREADED MEMBER AND SYNTHETIC RESIN PART FOR VEHICLE

(75) Inventors: Michio Nakamura; Tsutomu Takeuchi, both of Wako; Kenichi Hasegawa; Koichi Maruyama, both of Asaka, all of (JP)

(73) Assignees: Honda Giken Kogyo Kabushiki Kaisha, Tokyo; TS Tech Co., Ltd., Saitama, both of (JP)

( * ) Notice: Subject to any disclaimer, the term of this patent is extended or adjusted under 35 U.S.C. 154(b) by 0 days.

(21) Appl. No.: 09/501,231

(22) Filed: Feb. 10, 2000

(30) Foreign Application Priority Data

Feb. 18, 1999 (JP) .......................................... 11-039497

(51) Int. Cl.⁷ ................................................ B62J 9/18
(52) U.S. Cl. .................. 296/29; 296/65.03; 297/215.16
(58) Field of Search ........................ 296/29, 63, 65.03; 297/195.1, 215.16; 293/155

(56) References Cited

U.S. PATENT DOCUMENTS 6,257,662 B1 * 7/2001 Yates ................ 297/215.16 X

FOREIGN PATENT DOCUMENTS

| JP | 61-67080 | 5/1986 |
|----|----------|--------|
| JP | 62-484   | 1/1987 |

* cited by examiner

*Primary Examiner*—Joseph D. Pape
(74) *Attorney, Agent, or Firm*—Arent Fox Kintner Plotkin & Kahn, PLLC (57) ABSTRACT

In coupling a part or component of synthetic resin mounted on a vehicle and a threaded member capable of detachably engaging with the part, the part is provided with a retaining portion for retaining at least a portion of the threaded member against rotation relative to each other, and a claw construction means capable of disengageably engaging with the threaded member so as to inhibit the separation of the threaded member from the retaining portion. With this coupling structure, the operation of molding a part of synthetic resin for a vehicle having a threaded member integrally incorporated therein can be carried out easily and a labor-saving is achieved in the operation. Further, the recycling of parts defectively formed or the like can be promoted.

3 Claims, 13 Drawing Sheets

COUPLING STRUCTURE OF THREADED MEMBER AND SYNTHETIC RESIN PART FOR VEHICLE

BACKGROUND OF THE INVENTION

1. Field of the Invention

The present invention relates to a coupling structure of a threaded member and a synthetic resin part for a vehicle used for integrally incorporating a threaded member such as a bolt or a nut into a part or component of synthetic resin mounted on a vehicle.

2. Description of the Related Art

It is a conventional practice that such a threaded member is partially or entirely integrally embedded in a part of synthetic resin simultaneously with the formation of the part by injection molding or the like (for example, see Japanese Utility Model Application Laid-open Nos. 62-484 and 61-67080).

In the conventional structure, however, it is required that the threaded member be positioned and retained at a predetermined location within a mold in the course of molding the part. Since this operation is not easy, the operating efficiency is poor, and this is disadvantageous for saving the operating labor.

In the conventional structure, the threaded member made of metal is non-separatably integrally fixed in the part made of synthetic resin after the formation of the part by molding, resulting in a problem that a defectively molded part or a part which has been put into service, cannot be recycled as it is.

SUMMARY OF THE INVENTION

The present invention has been accomplished in view of the above-mentioned circumstances, and it is an object of the present invention to provide a coupling structure of a threaded member and a synthetic resin part for a vehicle, wherein the problem associated with the convention structure can be solved.

To achieve the above object, according to a first aspect and feature of the present invention, there is provided a coupling structure of a threaded member and a synthetic resin part for a vehicle comprising a part of synthetic resin and mounted on a vehicle, and a threaded member detachably mounted in the part, the part being provided with a retaining portion for retaining at least a portion of the threaded member against rotation relative to each other, and a claw means capable of disengageably engaging with the threaded member so as to inhibit the separation of the threaded member from the retaining portion. With such feature, after formation of the part of synthetic resin by molding, the threaded member can be fixed easily in a post-mounting manner in the part only by retaining at least a portion of the threaded member in the retaining portion of the part against rotation relative to each other and locking the threaded member on the claw means of the part after formation of the part of the synthetic resin. Even after the fixing of the threaded member, if the threaded member is separated from the claw means and drawn from the retaining portion, the threaded member can be separated easily from the part. Therefore, it is unnecessary to specially position and retain the threaded member in a mold in the course of molding the part, leading to a correspondingly simplified forming step. This contributes to an enhancement in forming operation efficiency and the saving of the operating labor. The part, which has been defectively molded or has been put into service, can be recycled as it is, by simply removing the threaded member therefrom. This is advantageous for the resource-saving for the part of synthetic resin for the vehicle.

According to a second aspect and feature of the present invention, in addition to the first feature, the claw means is provided to protrude on a back of the part of synthetic resin, and another threaded member is screwed to the threaded member from a surface side of the part. With such feature, the claw means protrudes on the back of the part of synthetic resin and is hidden from the surface of the part keeping a good external appearance. Moreover, the claw means cannot protrude on a screwing seat surface located on the surface of the part. Therefore, there is no possibility that the claw means may be a hindrance to a screwing operation. In addition, even if a large thrust load directed to the surface of the part is applied to the threaded member with the screwing of the threaded member, this thrust load need not be received by the claw means and hence, the claw means has an improved durability.

According to a third aspect and feature, in addition to the first or second feature, the part of synthetic resin is a seat bottom plate mounted on a saddle-riding vehicle, and the threaded member is used to detachably secure the seat bottom plate to a vehicle body. With such feature, it is possible to provide an enhancement in efficiency of and a labor-saving of the operation of forming the seat bottom plate having the threaded member mounted therein, and moreover, it is possible to promote the recycling of the seat bottom plate.

The above and other objects, features and advantages of the invention will become apparent from the following description of the preferred embodiment taken in conjunction with the accompanying drawings.

BRIEF DESCRIPTION OF THE DRAWINGS

FIGS. 1 to 4 show a first embodiment of the present invention, wherein

FIGS. 5 to 7 show a second embodiment of the present invention, wherein

FIGS. 8 to 10 show a third embodiment of the present invention, wherein

FIGS. 11 to 13 show a fourth embodiment of the present invention, wherein

DESCRIPTION OF THE PREFERRED EMBODIMENTS

The present invention will now be described by way of embodiments with reference to the accompanying drawings.

Figure 1:
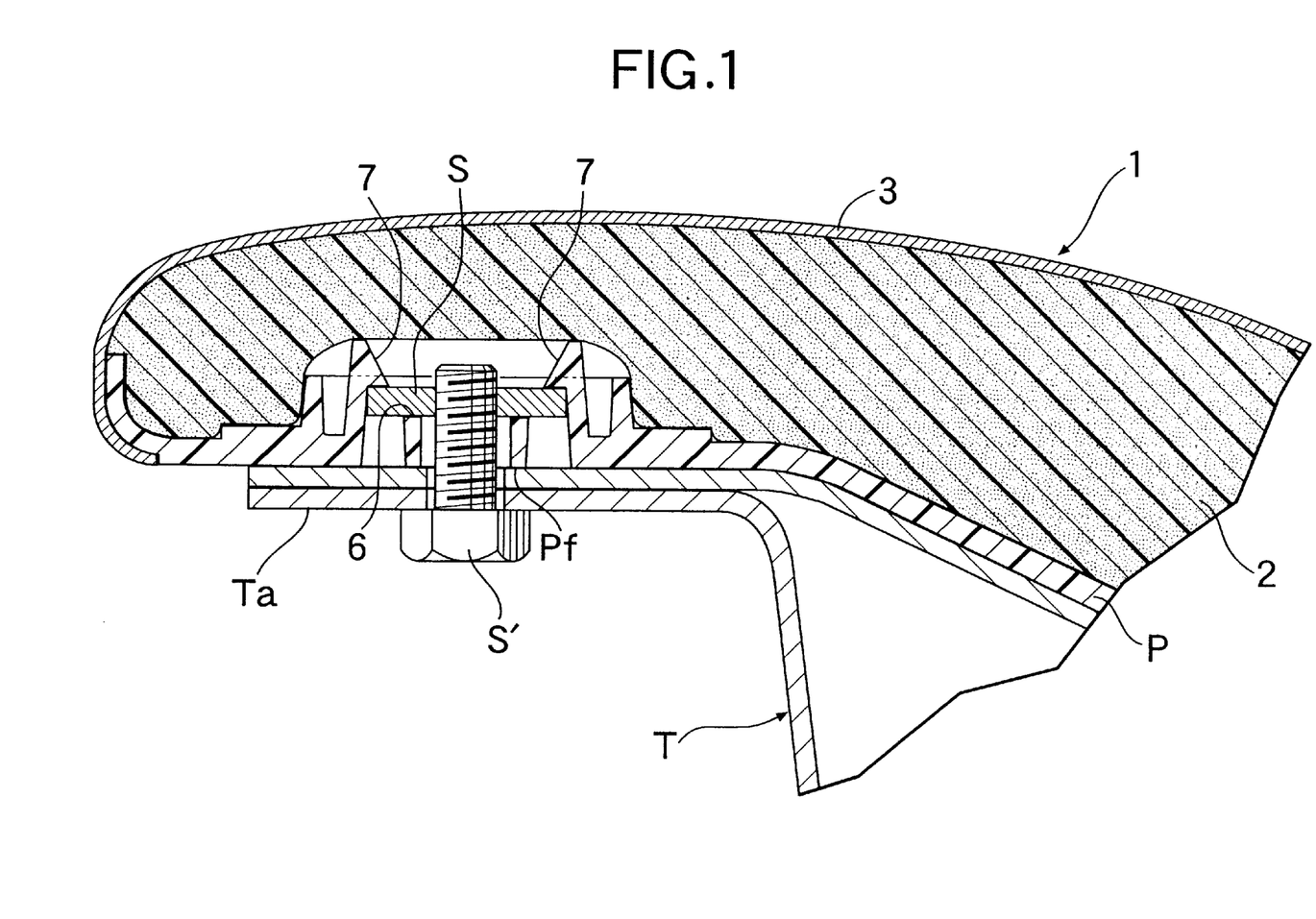
FIG. 1 is a sectional view of an essential portion of a seat-mounting area for a motorcycle.

Referring first to FIG. 1, a seat 1 is disposed in a motorcycle as a vehicle at a central portion of a vehicle body. The seat 1 is comprised of a seat cushion 2 having an elasticity, a seat bottom plate P covering a back of the cushion 2, and a seat skin 3 covering a peripheral edge of the bottom plate P and a surface of the seat cushion 2. The seat bottom plate P is formed into a plate shape by integrally molding a synthetic resin material such as by injection molding, and constitutes a part of synthetic resin in the present invention. A right side in FIG. 1 is an upper side in the vehicle.

A plurality of threaded members (nuts S in the illustrated embodiment) are detachably mounted at proper distances in the seat bottom plate P, and the bottom plate P is fixed to a member on the vehicle body (a side flange Ta of a fuel tank T in the illustrated embodiment) by screwing other threaded members (bolts S' in the illustrated embodiment) into the threaded members S from the side of the surface of the bottom plate P (the side opposite from the seat cushion 2). Each of the nuts constituting the threaded members S is formed from a material having a high rigidity (a metal material in the illustrated embodiment), and in the illustrated embodiment, is formed into a quadrangular flat plate-shape. A coupling structure of the threaded member S with the seat bottom plate P will be described below with reference to FIGS. 2 to 4.

Figure 2:
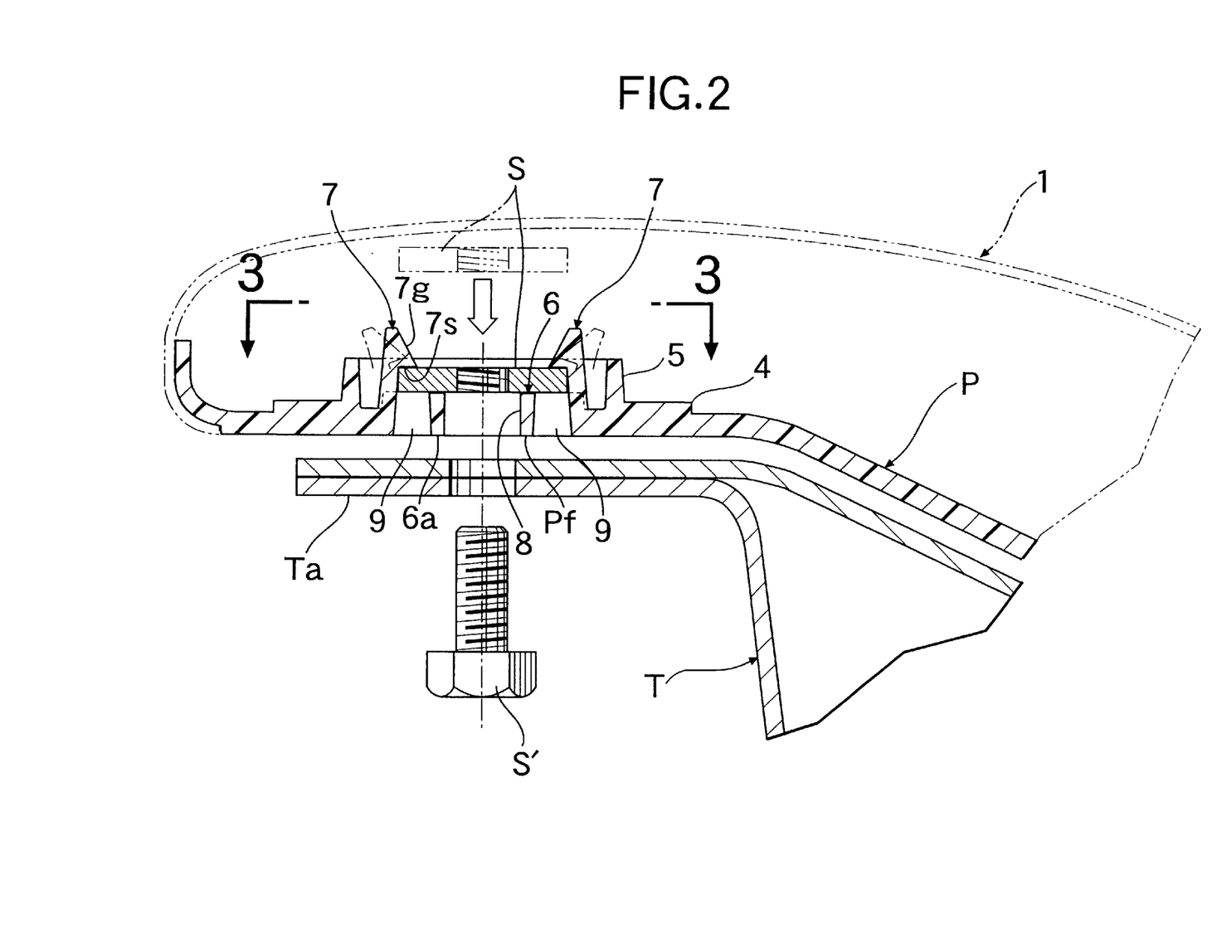
FIG. 2 is an exploded sectional view of the seat-mounting area (a sectional view taken along a line 2—2 in FIG. 3)
Figure 3:
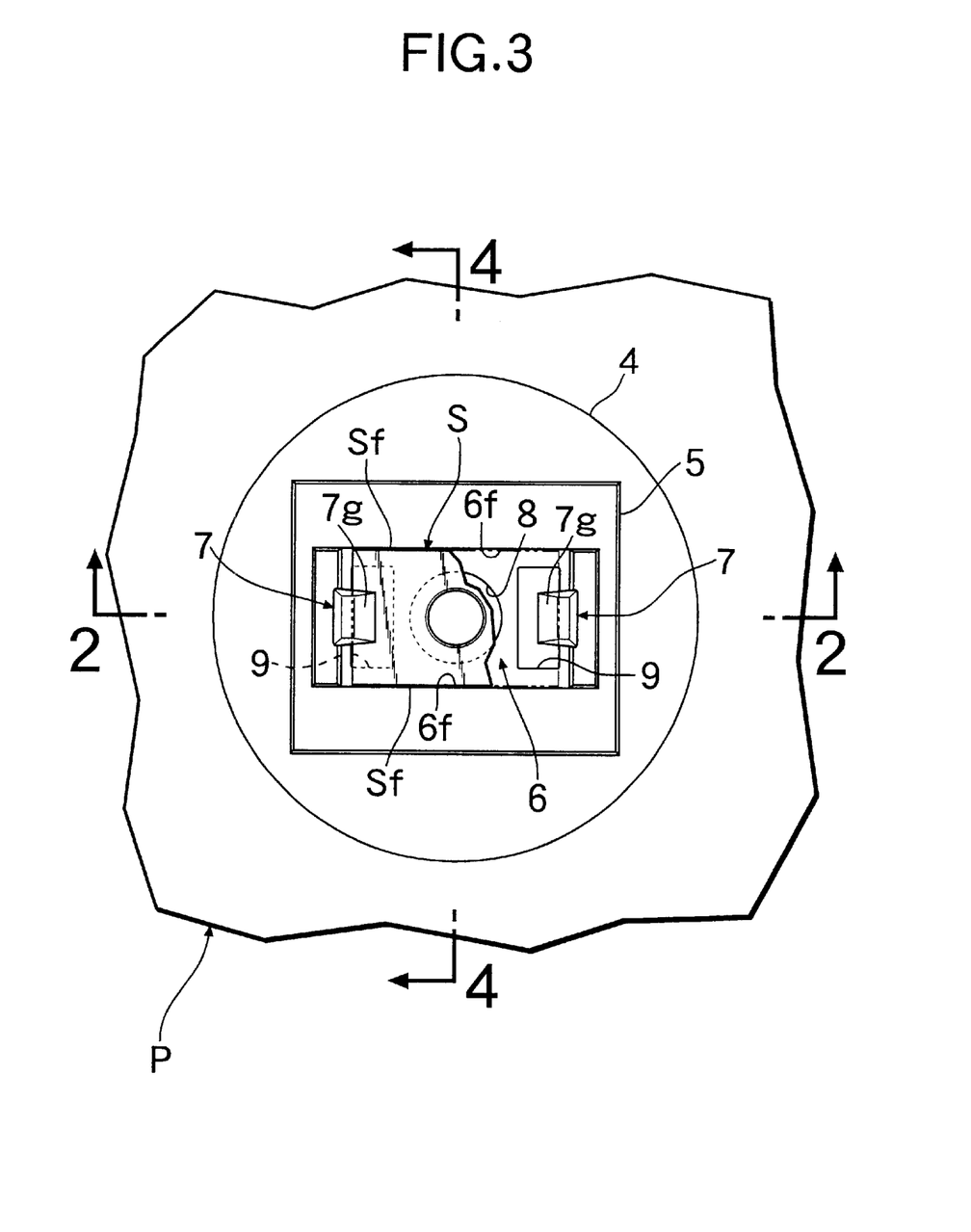
FIG. 3 is a view taken in the direction of an arrow 3 in FIG. 2.
Figure 4:
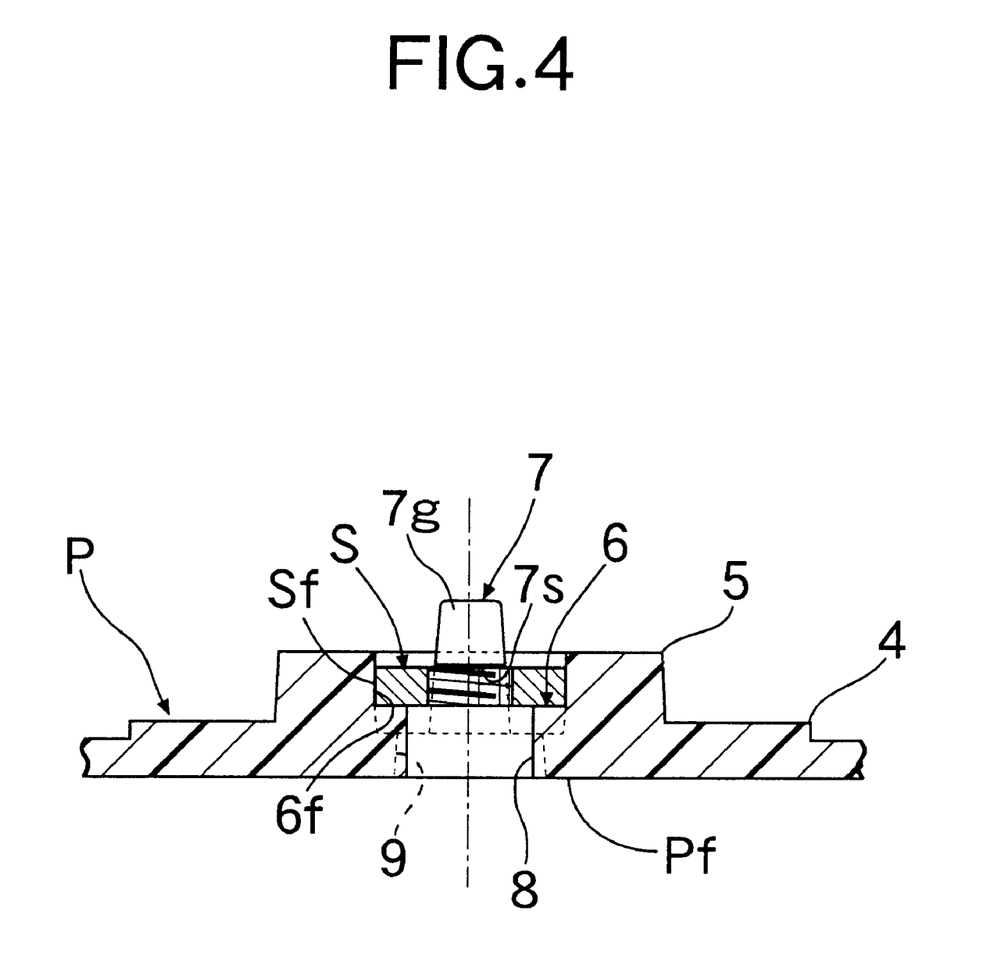
FIG. 4 is a sectional view taken along a line 4—4 in FIG. 3.

A circular mounting base 4 is integrally formed on the back of the seat bottom plate P (a side facing the seat cushion 2), and a quadrangular enclosure wall 5 is integrally provided at the central portion of the base 4 to protrude therefrom. A quadrangular mounting recess 6 is defined above the base 4 by the enclosure wall 5. The threaded member S is relatively non-rotatably fitted into and retained in the mounting recess 6. More specifically, opposite outer side surfaces Sf of the threaded member S are put into abutment against opposite opposed inner side surfaces 6f of the recess 6, and a bottom surface of the threaded member S is placed onto a bottom wall 6a of the recess 6. The mounting recess 6 constitutes a retaining portion in the present invention.

A pair of resilient claws 7 are projectingly, integrally provided on the bottom wall 6a of the mounting recess 6 in the vicinity of opposite ends of the recess 6, so that the separation of the member S from the mounting recess 6 is inhibited by engagement of both the claws 7 with opposite end edges of the member S with the threaded member S sandwiched between both the claws 7. The claws 7 have guiding slants 7g opposed to each other at their free ends, respectively. When the threaded member S has been pushed into the recess 6 along the slants 7g, the claws 7 are resiliently deformed (see a one-dot dashed line in FIG. 2), so that they are spread out from each other to permit the passage of the threaded member S, whereby the claws 7 can be brought into engagement with the opposite end edges of the members S.

The bottom wall 6a of the mounting recess 6 includes a through-bore 8 defined therein, through which a shank of the other threaded member (the bolt S' in the illustrated embodiment) to be threadedly fitted into the threaded member S is passed with a play left therebetween, and a pair of small through-bores 9 defined therein on opposite sides of the through-bore 8. The small through-bores 9 can be shaped, simultaneously with the formation of the seat bottom plate P by molding, as a trace of withdrawal of a male die (not shown) for molding that stopper surface 7s of each of the claws 7 which is connected to the guiding slang 7g. Draft angles for facilitating the releasing of a molding from the mold are established on backs of the claws 7, inner and outer side surfaces of the mounting recess 6 and inner surfaces of the small through-bores 9.

The operation of the above-described embodiment will be described below. The seat bottom plate P as a part of synthetic resin is formed integrally as the whole by injection molding or the like. After the formation of the seat bottom plate P, the threaded member S is brought into engagement with the claws 7 of the seat bottom plate P by pushing, and the threaded member S is relatively non-rotatably fitted into and retained in the mounting recess 6 (a retaining portion) of the plate P. In this manner, the threaded member S can be fixed easily to the seat bottom plate P in a post-mounting manner.

Even after fixing of the threaded member S, if the claws 7 are forcibly spread using a tool or the like, permitting the threaded member S to be separated from the claws 7, so that the threaded member S is drawn out of the mounting recess 6, the threaded member S can be separated easily from the seat bottom plate P.

Therefore, it is unnecessary to specially position and retain the threaded member S within the forming mold in the course of molding the seat bottom plate P and hence, the forming step is correspondingly simplified, whereby the forming operation is facilitated, and the labor for the forming operation can be reduced. The seat bottom plate P, which has been defectively formed or has been put into service can be recycled, as it is, by easily separating the threaded member S from such seat bottom plate P.

In particular, the structure is such that the claws 7 protrude on the back of the seat bottom plate P (on the side facing the seat cushion 2), and the other threaded member S' is fastened to the threaded member S mounted within the bottom plate P from the side of the surface of the plate P, and hence, the claws 7 are hidden from the side of the surface of the bottom plate P keeping a good external appearance. Moreover, the claws 7 cannot protrude into a screwing seat surface Pf located on the surface of the plate P and hence, there is no possibility that the claws 7 may interfere with the screwing operation. In addition, even if a large thrust load in the direction toward the surface of the bottom plate P is applied to the threaded member S within the bottom plate P in response to the screwing, this thrust load need not be received by the claws 7 and hence, the burden of the load on the claws 7 can be alleviated, leading to an improved durability of the claws 7.

Figure 5:
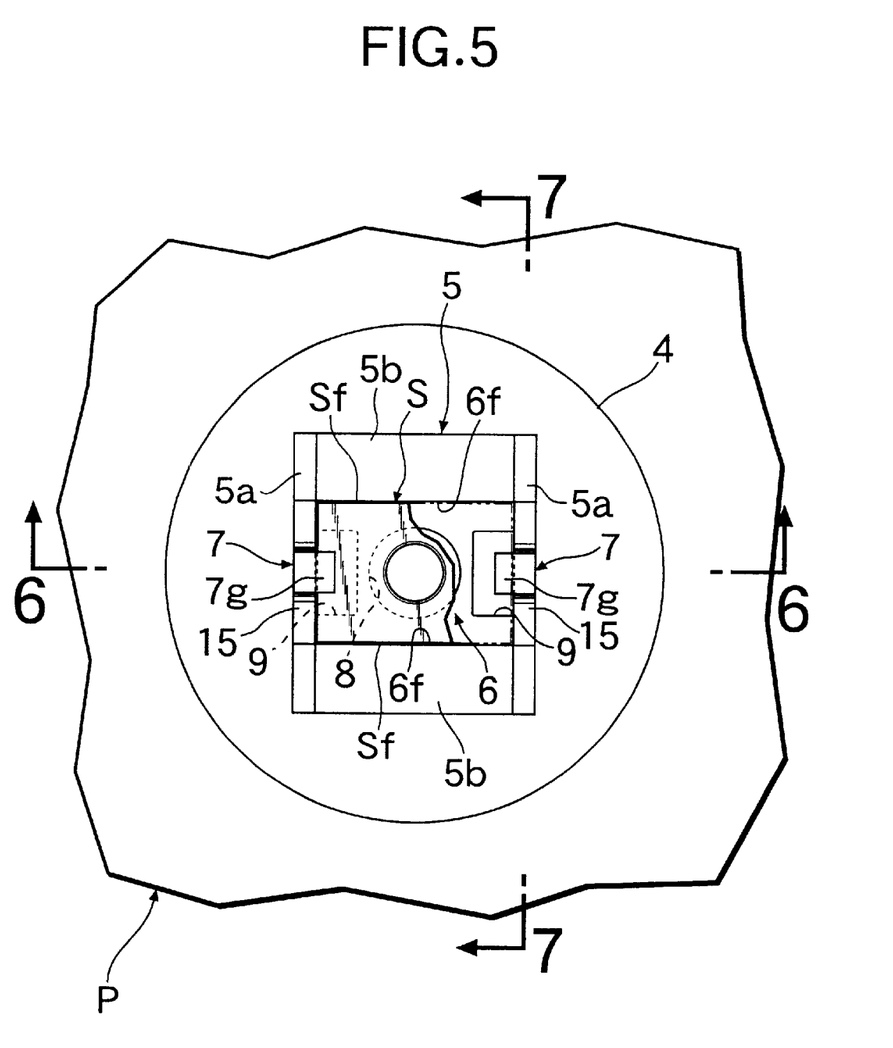
FIG. 5 is a view similar to FIG. 3, but showing the second embodiment.
Figure 6:
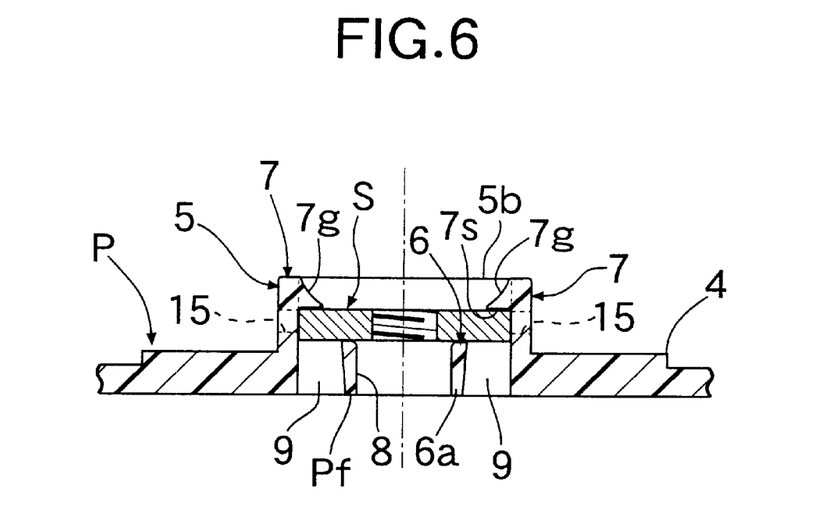
FIG. 6 is a sectional view taken along a line 6—6 in FIG. 5.
Figure 7:
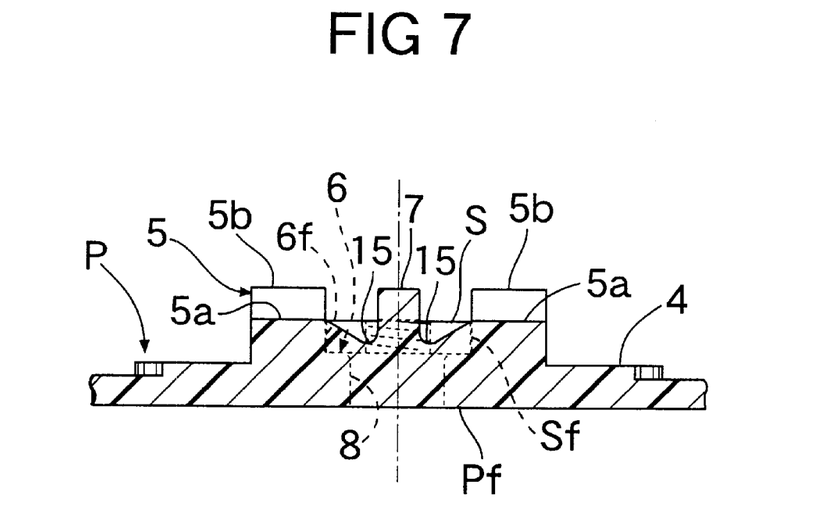
FIG. 7 is a sectional view taken along a line 7—7 in FIG. 5.

A second embodiment of the present invention will now be described with reference to FIGS. 5 to 7. In this embodiment, opposite end walls 5a of an enclosure wall 5, which are opposed to each other, are formed relatively at a low level, and a resilient claw 7 is integrally projectingly provided at the central portion of an upper surface of each of the opposite end walls 5a in such a manner that it is sandwiched between a pair of notched recess 15. Opposite sidewalls 5b of the enclosure wall 5, which are opposed to each other, are formed relatively at a high level (at the same height as the claws 7 in the illustrated embodiment), and a difference in level is formed between each of the opposite sidewalls 5b and each of the opposite end walls 5a. The other structure is basically similar to that in the first embodiment and hence, members or portions corresponding to the first embodiment are designated by like reference characters and the detailed description of them is omitted. Even in this embodiment, the function and effects similar to those in the first embodiment can be provided. Further, a portion of the enclosure wall 5 also serves as the claw 7, leading to a correspondingly simplified structure.

Figure 8:
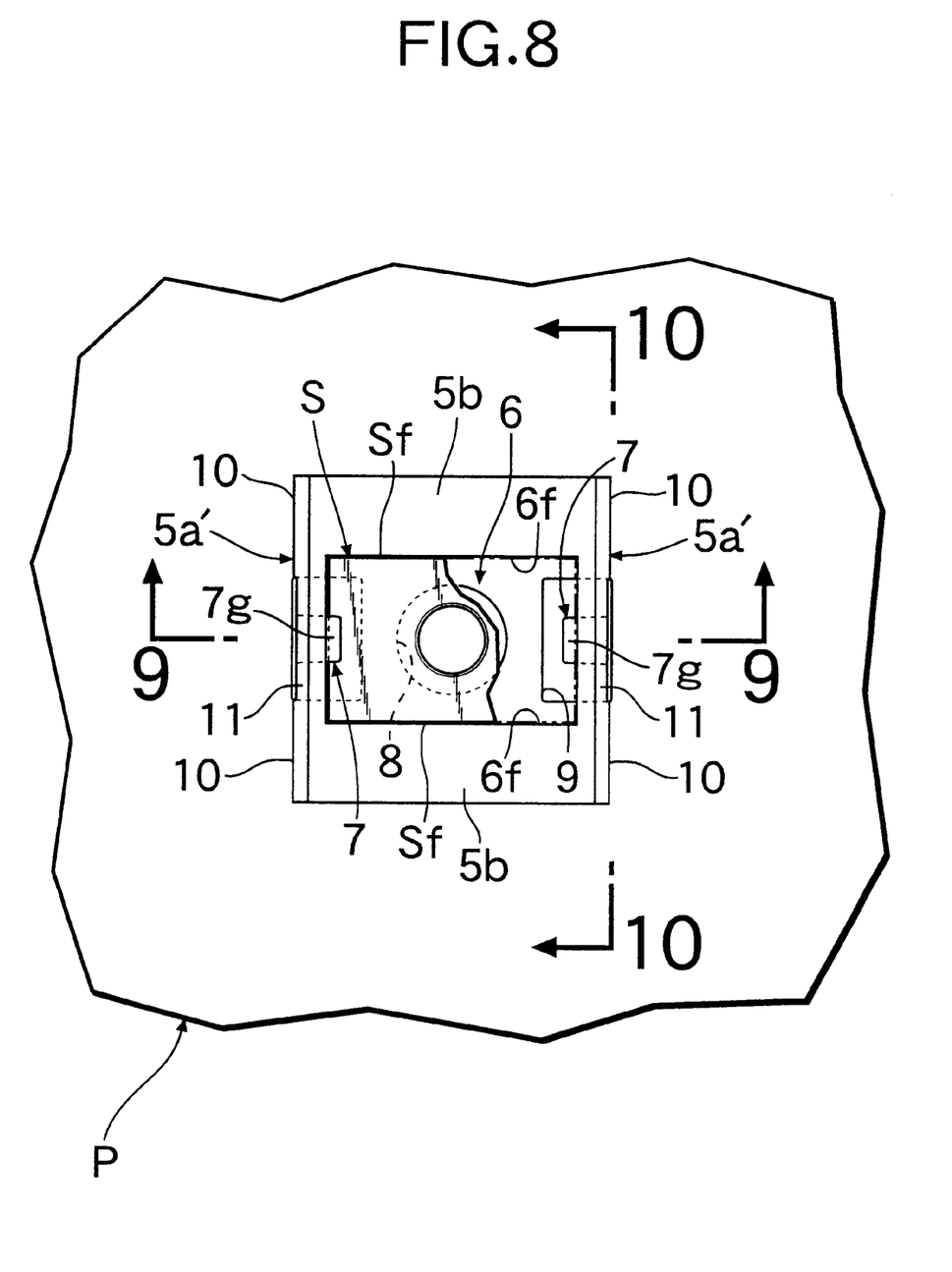
FIG. 8 is a view similar to FIG. 3, but showing the third embodiment.
Figure 9:
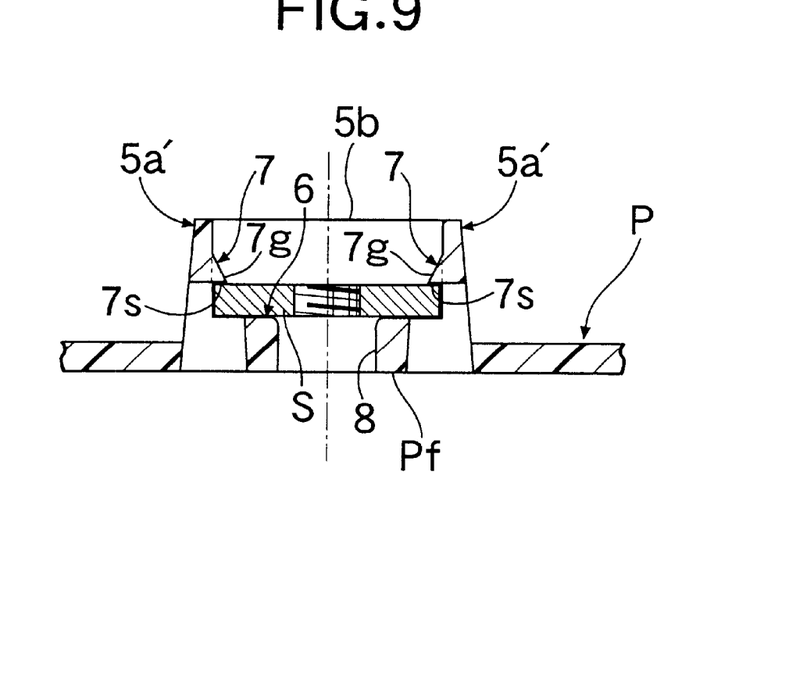
FIG. 9 is a sectional view taken along a line 9—9 in FIG. 8.
Figure 10:
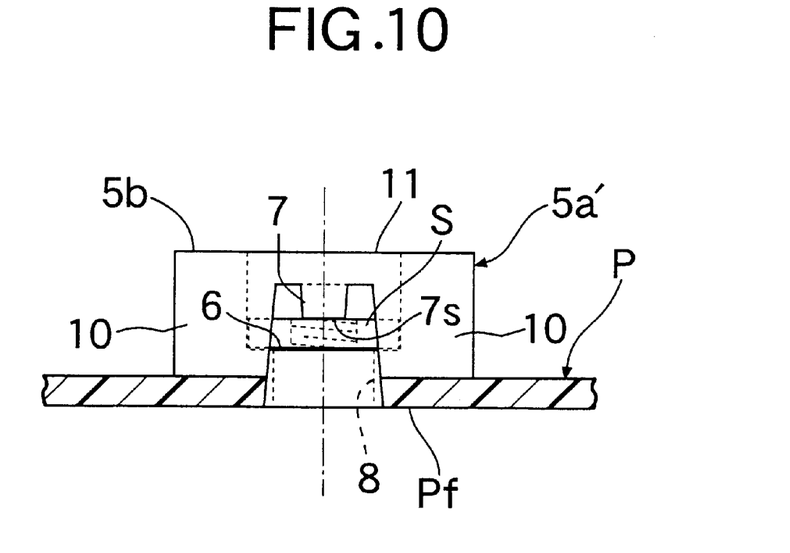
FIG. 10 is a sectional view taken along a line 10—10 in FIG. 8.

A third embodiment of the present invention will now be described with reference to FIGS. 8 to 10. In this embodiment, each of opposite opposed end walls 5a' of an enclosure wall 5 is formed into a gate-shape as a whole and comprised of a pair of left and right raised walls 10, and a horizontal connecting wall 11 which connects upper ends of the raised walls 10 to each other. A resilient claw 7 is integrally provided at a lower portion of the connecting wall 11 connecting the gate-shaped end walls 5a' to extend downwards. The other structure is basically similar to that in the second embodiment and hence, members or portions corresponding to those in the second embodiment are only designated by like reference characters and the detailed description of them is omitted. Even in the third embodiment, the function and effects similar to those in the second embodiment can be provided.

Figure 11:
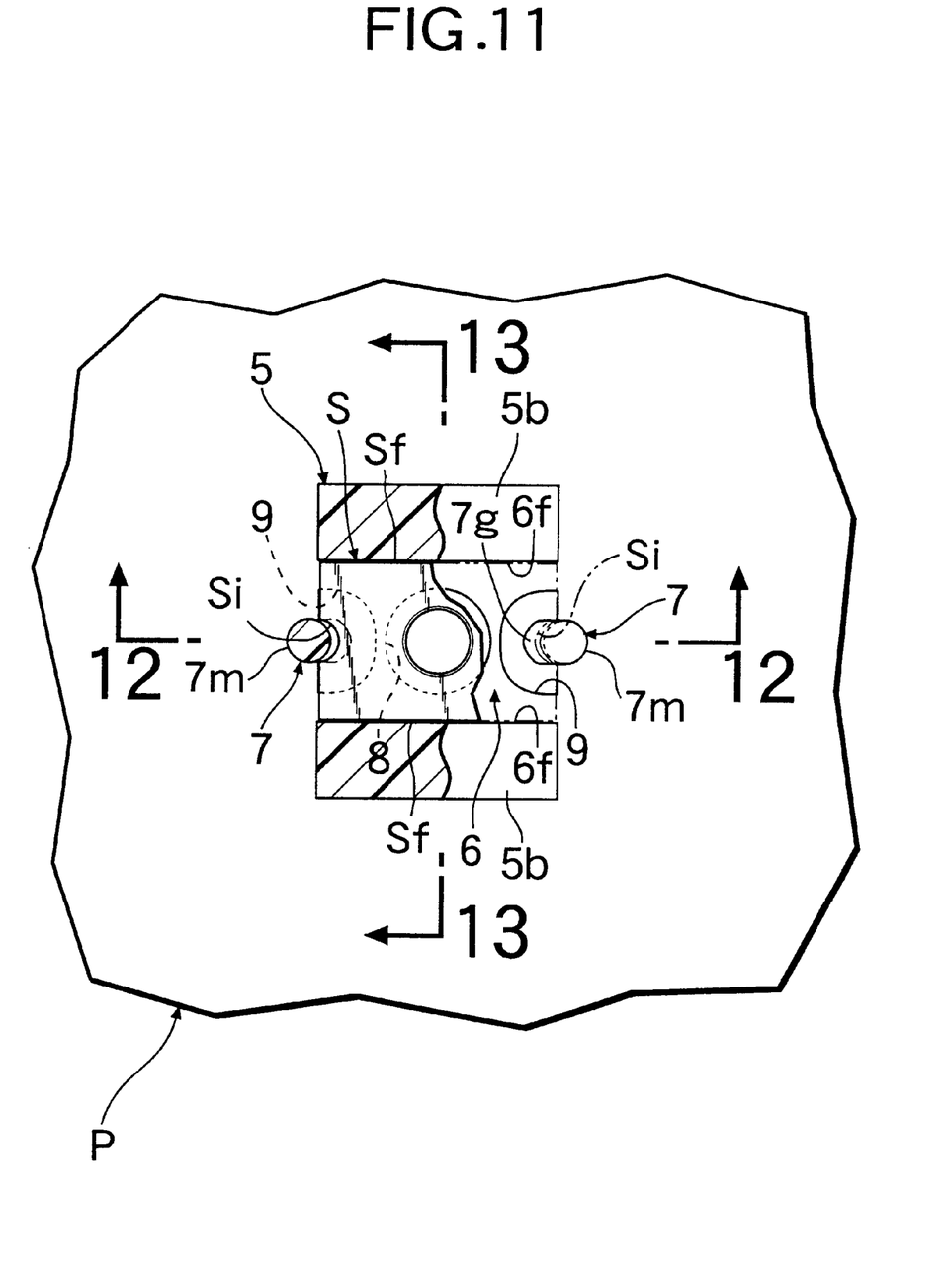
FIG. 11 is a sectional view similar to FIG. 3, taken along a line 11—11 in FIG. 12, but showing the fourth embodiment.
Figure 12:
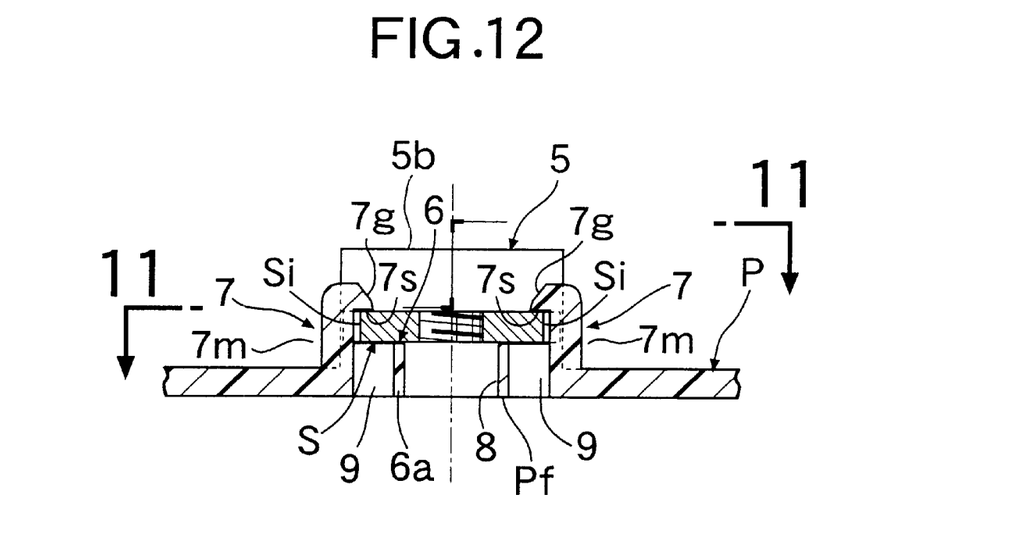
FIG. 12 is a sectional view taken along a line 12—12 in FIG. 11.
Figure 13:
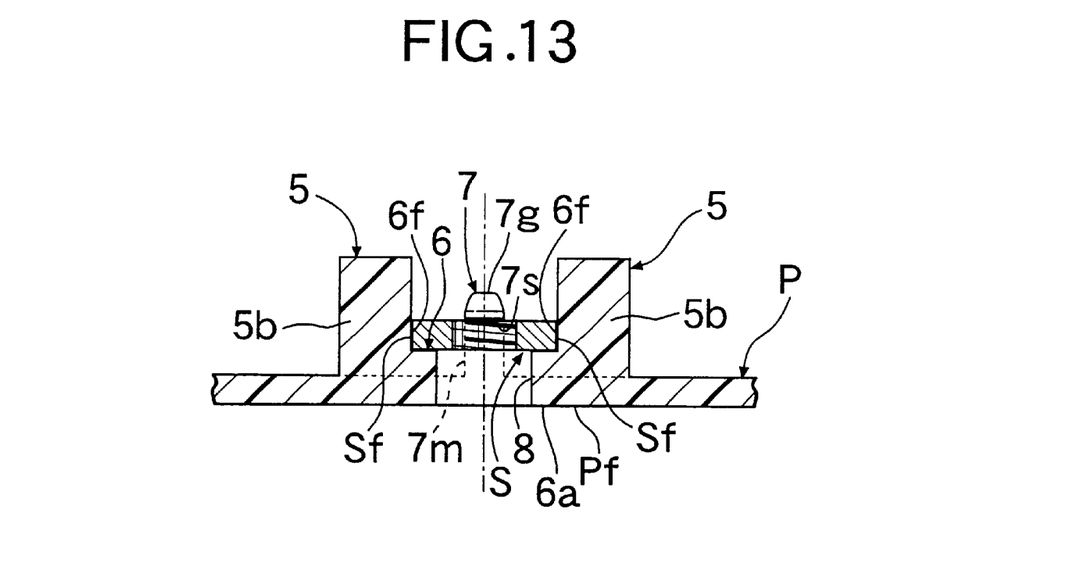
FIG. 13 is a sectional view taken along a line 13—13 in FIG. 11.

A fourth embodiment of the present invention will now be described with reference to FIGS. 11 to 13. In this embodiment, opposite opposed ends of an enclosure wall 5 are opened, and a mounting recess 6 as a retaining portion is defined between opposite opposed sidewalls 5b of the enclosure 5. A pair of resilient claws 7 are projectingly integrally provided on a bottom wall 6a of the mounting recess 6, and rise to sandwich a threaded member S therebetween. A shank 7m of each of the resilient claws 7 is formed into a columnar shape, and an arcuate notch Si is defined at each of opposite ends of the threaded member S to engage the shank 7m. This engagement exhibits an effect of preventing the rotation of the threaded member S and hence, a torque load to the rotation of the threaded member S is alleviated. The other structure is basically similar to that in the first embodiment and hence, members or portions corresponding to those in the first embodiment are only designated by like reference characters, and the detailed description of them is omitted. Even in the fourth embodiment, the function and effects similar to those in the first embodiment can be provided. Further, the claw 7 also serves as a means of preventing the withdrawal of the threaded member S and as a means of preventing the rotation of the threaded member S. Therefore, the structure is simplified correspondingly, and an effect of preventing the rotation of the threaded member S is enhanced.

Figure 14:
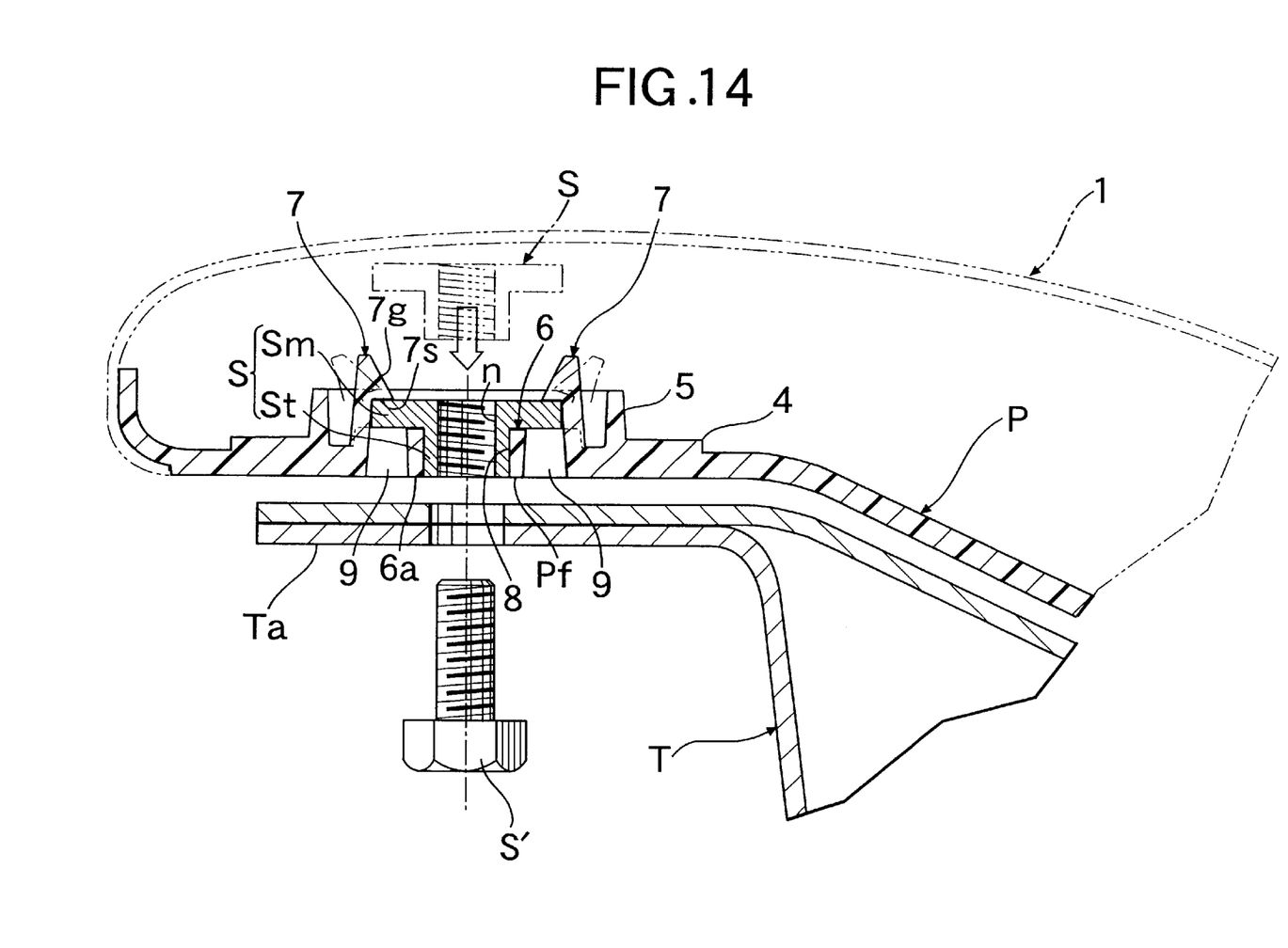
FIG. 14 is a view similar to FIG. 2, but showing a modification of a threaded member.

A modification to the threaded member S is shown in FIG. 14. In this modification, a cylindrical projection St is integrally provided on a lower surface of a threaded member body Sm formed into a quadrangular flat plate-shape as in each of the above-described embodiments, so that the projection St is fitted into a through-bore 8 in a bottom wall 6a of a mounting recess 6. A threaded bore n is provided through the projection St and the threaded member body Sm. A tip end surface (an outer end surface) of the projection St is formed flush with a screwing seat surface Pf on a surface of a seat bottom plate P. The threaded member S of this modification is shown as being applied to the seat bottom plate P according to the first embodiment for convenience for the description, but it is of course that the threaded member S may be used as described above in combination with each of the seat bottom plates P according to the second, third and fourth embodiments.

With this modification, even if the threaded member body Sm is flat, a threaded bore n can be defined at a sufficient length due to the presence of a cylindrical projection St, leading to an enhanced screwing force. Moreover, the cylindrical projection St is flush at the outer end surface with the screwing seat surface Pf on the surface of the seat bottom plate P and is capable of firmly receiving a screwing force provided when another threaded member S' is screwed. Namely, the cylindrical projection St serves as a distance collar. Therefore, the following advantages are provided. The load burden on the bottom wall 6a of the mounting recess 6 upon the screwing can be alleviated, thereby reliably avoiding that the threaded member S is too screwed into the bottom wall 6a made of synthetic resin to damage the bottom wall 6a. Further, an opening end of the threaded bore n can be provided to open directly into the surface of the seat bottom plate P and hence, the other threaded member S' can easily be screwed into the opening end of the threaded bore n.

Although the embodiments of the present invention have been described in detail, it will be understood that the present invention is not limited to the above-described embodiments, and various modifications in design may be made without departing from the spirit and scope of the invention defined in claims.

For example, the seat bottom plate for the motorcycle is illustrated as the part of synthetic resin mounted on the vehicle in each of the above-described embodiments, but the present invention is applicable to a structure in which the threaded member is screwed into and fixed in another part of synthetic resin mounted on a motorcycle. Further, the present invention is applicable to a structure in which the threaded member is screwed into and fixed in a part of synthetic resin mounted on a saddle-riding vehicle other than the motorcycle (e.g., a motor-tricycle, a four-wheel buggy and the like) and a vehicle other than the saddle-riding vehicle (e.g., a four-wheel automobile, a truck and the like).

Figure 15:
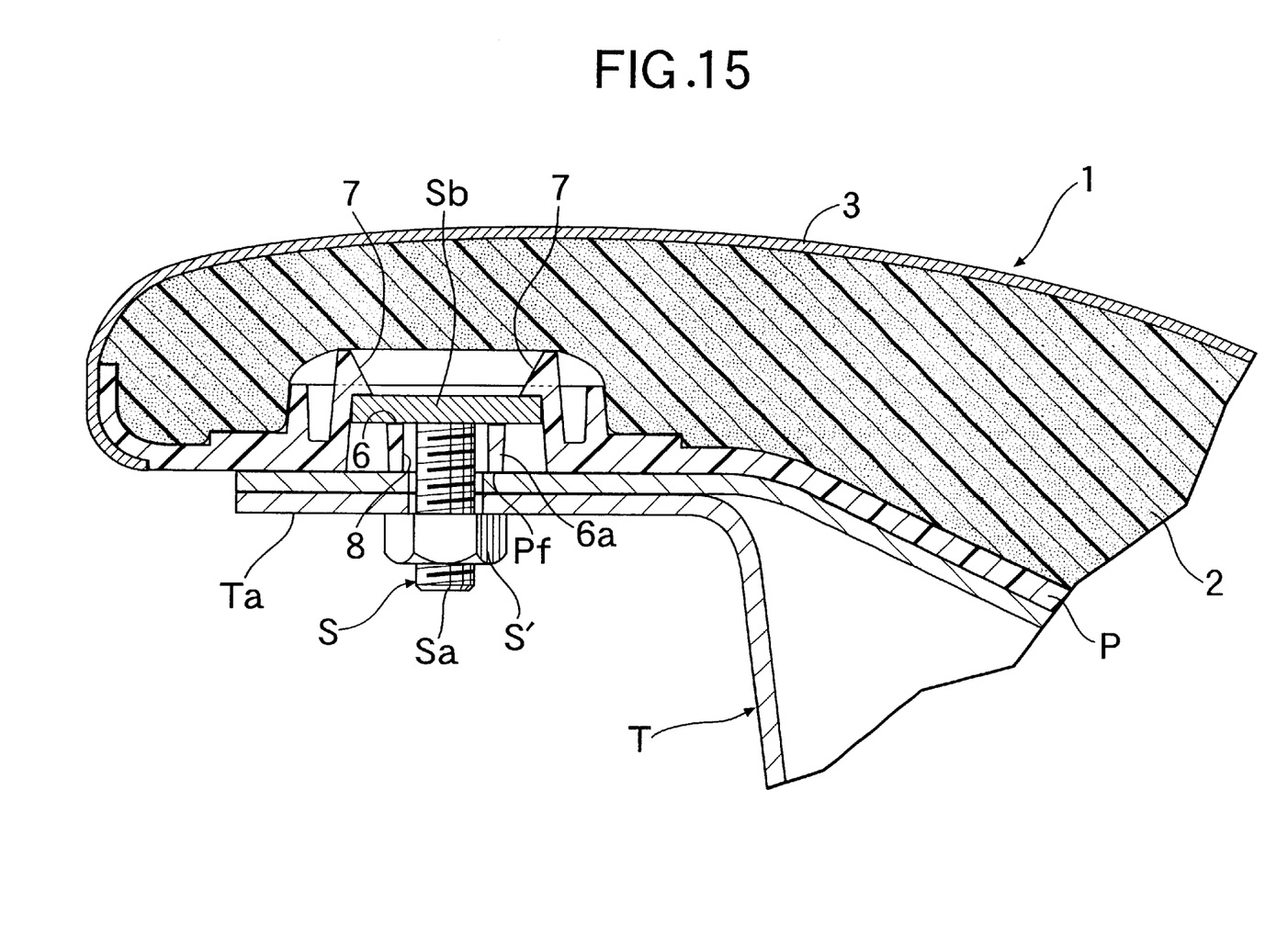
FIG. 15 is a view similar to FIG. 1, but showing another modification in which a bolt is used as a threaded member.
Figure 16:
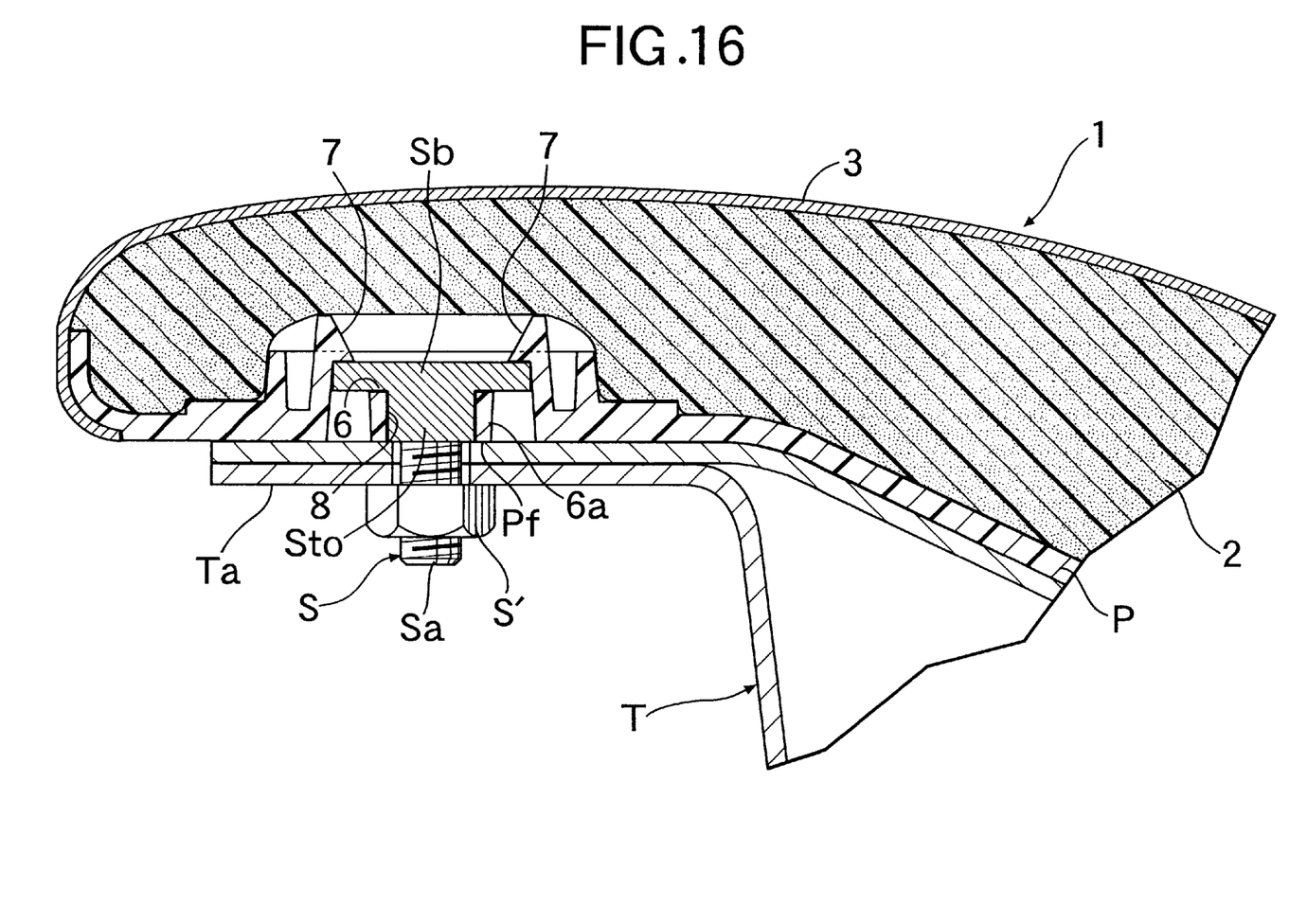
FIG. 16 is a view similar to FIG. 1, but showing a further modification in which a bolt is used as a threaded member.

The nut has been illustrated as being the threaded member S to be fixed in the part P of synthetic resin in each of the above-described embodiments, but the present invention is applicable to a structure in which a threaded member other than the nut, e.g., a bolt, is fixed in a part of synthetic resin. In this case, the bolt S is provided with its threaded shank Sa protruding from the surface of the part P of synthetic resin and with its polygonal head Sb being relatively non-rotatably fitted and retained in the retaining portion 6 of a part P of synthetic resin, as shown in FIGS. 15 and 16, so that the removal of the polygonal head Sb of the bolt from the retaining portion 6 can be inhibited by claws 7 of the part P. In particular, in the bolt S shown in FIG. 16, a columnar projection $St_0$ is integrally formed on the flat polygonal head Sb and fitted into the through-bore 8 in the bottom wall 6a of the mounting recess 6. The columnar projection $St_0$ has an outer end surface flush with a screwing seat surface Pf on the surface of the seat bottom plate P, and the threaded shank Sa integrally provided thereon to protrude from such outer end surface. The columnar projection $St_0$ is capable of firmly receiving a screwing force provided upon the screwing of another threaded member S', namely, serves as a distance collar. Therefore, the load burden on the bottom wall 6a of the mounting recess 6 during screwing of the threaded member S can be alleviated to reliably avoid that the threaded member S is too screwed into the bottom plate 6a of the synthetic resin to damage the bottom plate 6a.

The mating member, to which the part p of synthetic resin is mounted using the threaded members s and S', has been described as being the fuel tank T (the outer flange Ta) in each of the embodiments, but according to the present invention, the mating member is not limited particularly, and for example, may be a vehicle body flame or a proper member or part which is to be secured to the vehicle body flame.

What is claimed is:

1. A coupling structure of a threaded member and a synthetic resin part for a vehicle, comprising a part of synthetic resin and mounted on a vehicle, and a threaded member detachably mounted in said part, said part being provided with a retaining portion for retaining at least a portion of said threaded member against rotation relative to each other, and a claw means capable of disengageably engaging with said threaded member so as to inhibit the separation of said threaded member from said retaining portion.

2. A coupling structure of a threaded member and a synthetic resin part for a vehicle according to claim 1, wherein said claw means is provided to protrude on a back of said part of synthetic resin, and another threaded member is screwed to said threaded member from a surface side of said part.

3. A coupling structure of a threaded member and a synthetic resin part for a vehicle according to claim 1, wherein said part of synthetic resin is a seat bottom plate mounted on a saddle-riding vehicle, and said threaded member is used to detachably secure said seat bottom plate to a vehicle body.

* * * * *